United States Patent [19]

Verges

[11] Patent Number: 4,706,346
[45] Date of Patent: Nov. 17, 1987

[54] CLAMPING COLLAR

[75] Inventor: Jaime M. Verges, Sabadell, Spain

[73] Assignee: Mikalor, S.A., Sabadell, Spain

[21] Appl. No.: 763,343

[22] Filed: Aug. 7, 1985

[30] Foreign Application Priority Data

Aug. 9, 1984 [ES] Spain .................................. 281.033

[51] Int. Cl.⁴ ............................................. B65D 63/00
[52] U.S. Cl. .............................. 24/274 R; 24/274 WB
[58] Field of Search .......... 24/274 R, 274 P, 274 WB, 24/275, 276, 279, 280

[56] References Cited

U.S. PATENT DOCUMENTS

| 2,560,198 | 7/1951 | Stevens | 24/274 R X |
| 2,944,314 | 7/1960 | Black | 24/274 R X |
| 4,237,588 | 12/1980 | Rasmussen et al. | 24/274 R |
| 4,473,928 | 10/1984 | Johnson | 24/274 R |
| 4,528,730 | 7/1985 | Spaulding | 24/274 R |

FOREIGN PATENT DOCUMENTS

| 98601 | 8/1960 | Denmark | 24/274 R |
| 865085 | 7/1949 | Fed. Rep. of Germany | 24/274 R |
| 2622548 | 12/1976 | Fed. Rep. of Germany | 24/274 R |
| 80296 | 1/1956 | Netherlands | 24/274 R |
| 293279 | 7/1928 | United Kingdom | 24/274 R |
| 708444 | 5/1954 | United Kingdom | 24/274 R |
| 1112237 | 5/1968 | United Kingdom | 24/274 R |
| 1486154 | 9/1977 | United Kingdom . | |

Primary Examiner—Kenneth J. Dorner
Assistant Examiner—Laurie K. Cranmer
Attorney, Agent, or Firm—Flynn, Thiel, Boutell & Tanis

[57] ABSTRACT

An improved clamping collar of the type comprising a hooped band, one end of which mounts thereon a support for a rotatable screw which meshes with teeth stamped at the opposite end of the band. The support is formed by a portion having a U-shaped section which has longitudinal entrant portions which are fitted into the neck of the screw for providing the necessary support for same, and for preventing the screw from coming out on slackening of the clamping collar.

5 Claims, 6 Drawing Figures

CLAMPING COLLAR

BACKGROUND OF THE INVENTION

The present invention refers to an improved clamping collar.

More precisely, the invention provides a clamping collar of the type formed from a hooped band, one end of which comprises a support for a screw for graduating and adjusting the opening of the clamping collar, whereas the opposite end has stamped therein the teeth of a screw thread for effecting said adjustment.

The improvement provided by the invention concerns specifically the means for fixing the support of the screw to the hooped band, which means provide substantial advantages which improve the functioning and efficiency of the clamping collar.

To facilitate the explanation, the present description refers to the accompanying drawing in which a preferred embodiment of the invention is shown by way of example.

DETAILED DESCRIPTION

Figure 1:
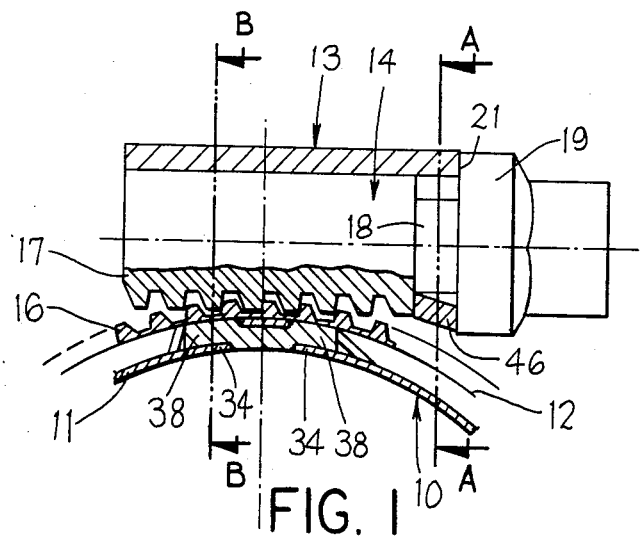
FIG. 1 is a longitudinal, partially broken sectional, view of the means for fixing the screw support to the band same being substantially as taken on the line VI—VI of FIG. 5.

Referring to the drawings, there is illustrated the improved clamping collar arrangement of the present invention, which collar includes a band or hoop 10 having overlapping end portions 11 and 12 which can be displaced relative to one another to permit tightening of the band around an object. The band 10 is typically constructed from a thin sheetlike metal which is flexible so that the band can conform to the object which is positioned therein. The one band end 11, namely the inner end, stationarily mounts thereon a support 13 in which is positioned a rotatable screw member 14, the latter being disposed for engagement with teeth 16 which are associated with the outer end band 12. These teeth 16 are typically formed by being stamped from the sheet material defining the band.

The screw member 14 includes a main threaded part 17 having a substantially endless thread therearound, this part 17 being rotatably supported within the support 13. Threaded part 17 has a reduced-diameter cylindrical neck part 18 integrally fixed at one end thereof, and this neck part 18 in turn is joined to an enlarged head 19 which rotatably bears against the end face 21 of the support. This enlarged head 19 typically has a noncircular configuration, such as square or hexagonal, for permitting engagement with a tool such as a wrench.

Figure 3:
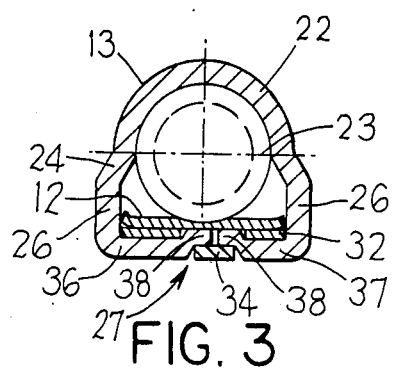
FIG. 3 shows a sectional view along line B—B of FIG. 1.
Figure 4:
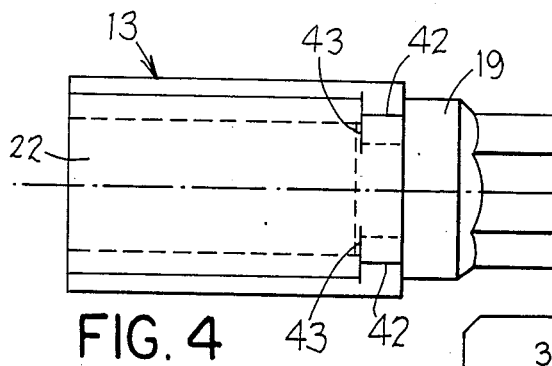
FIG. 4 is a top view of the detail shown in FIG. 1.
Figure 5:
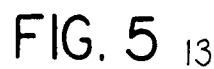
FIG. 5 is a lower plan view of the means for fixing the support to the band.
Figure 6:
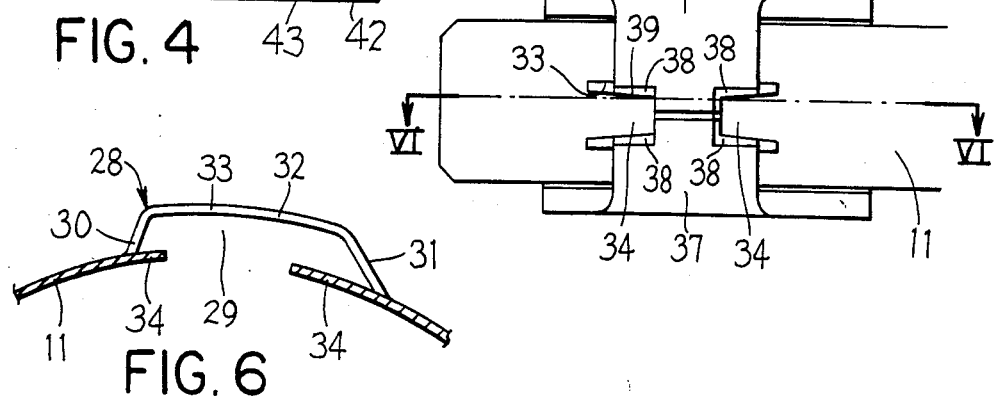
FIG. 6 is a fragmentary sectional view of the band end portion substantially as taken on the line VI—VI of FIG. 5.

Considering now the support 13, same is fixed to the inner end 11 of the band but projects outwardly so as to surround both the outer band end 12 and the rotatable screw member 14. For this purpose, the support 13 includes a main U-shaped portion 22 which is elongated in the circumferential direction of the band and is sized to effectively function as a rotatable support bearing for the threaded part 17. For this purpose, the U-shaped portion 22 opens downwardly and is positioned substantially directly over the upper half of the threaded part 17, with this U-shaped portion 22 being of a substantially semi-circular configuration in that it has the legs thereof projecting downwardly substantially to or slightly below the diametral plane 23 of the screw member 14. The legs of this U-shaped portion 22, at or slightly below the diametral plane 23, are flared or offset outwardly in opposite directions as indicated at 24, and these offset portions 24 in turn are then bent downwardly to define substantially parallel lower leg parts 26 which project downwardly so as to straddle the opposite sides of the overlapping band ends 11 and 12 as illustrated by FIG. 3.

To permit fixed securement of the support 13 to the inner band end 11, band end 11 and support 13 have an interfitting mounting structure 27 cooperating therebetween.

To define this mounting structure 27, the inner band end 11 has a longitudinally extending part 28 thereof offset or deformed outwardly relative to the adjacent parts of the band to define a shallow recess 29 under the band. More specifically, this offset band part 28 is offset outwardly at 30 and 31, which latter offsets are longitudinally spaced apart and are joined together by the raised base portion 32, whereby these offsets 30-31 and base portion 32 define the recess 29. These offsets 30 and 31 project outwardly from the inner band end 11 toward the outer band end 12.

This offset band part 28 has a longitudinally extending recess or notch 33 formed therethrough, which notch extends longitudinally throughout and slightly past the offsets 30-31. The notch 33 is positioned substantially along the longitudinal centerline of the band and is of narrow width so that the notch is spaced inwardly from opposite longitudinal edges of the band, and hence does not communicate with or open through the band edges. The band end 11 also has a pair of locking tabs 34 associated therewith in the vicinity of the offset band part 28. These locking tabs 34 are substantially planar with the main part of the band, and project inwardly in cantilever fashion toward one another from adjacent the opposite ends of the notch 33, whereby the locking tabs 34 are spaced downwardly from the raised base portion 32. These locking tabs 34 effectively function as cantilevered detents or springs as explained hereinafter.

The interfitting mounting structure 27 also includes opposed lugs 36 and 37 which are fixedly, here integrally, associated with the support 13. The lugs 36 and 37 are platelike elements which are fixed to the opposite lower edges of the lower leg parts 26 and which are bent inwardly in substantially perpendicular relationship relative to the respective lower leg parts 26. The lugs 36 and 37 project inwardly in directly opposed relationship to one another so as to be disposed substantially within the recess 29 and hence underlie the offset band part 28. The lugs 36 and 37 are effectively deformed upwardly adjacent the free corners thereof so that each lug 36 and 37 has a pair of upwardly projecting retaining tabs 38 thereon, which tabs are disposed adjacent the opposite corners of the free edge of the lug. These retaining tabs 38 project upwardly into the notch 33 formed in the offset band part 29 so as to prevent the lugs from sidewardly disengaging the band. The underside of the retaining tabs 38 define hollows or recesses 39 therein, and these hollows 39 accommodate therein the locking tabs 34 so as to maintain the lugs 36 and 37 snugly against the raised base 32 of the band, and at the same time maintain the retaining tabs 38 within the notch 33, thus providing a very secure and strong connection between the support 13 and the inner end 11 of the band.

Figure 2:
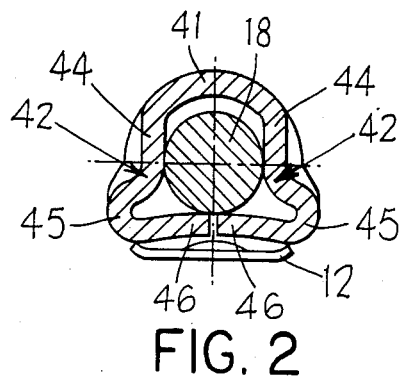
FIG. 2 is a sectional view along line A—A of FIG. 1.

The support 13 also has structure associated therewith for effecting axial securement of the rotatable screw member. For this purpose, the support has structure at the end thereof directly adjacent the screw head, which structure cooperates with the neck part 18 of the screw member. As illustrated in FIGS. 1 and 2, this end part of the support 13 is generally U-shaped and includes an upper base 41 which is integral with the upper base portion of the main U-shaped portion 22. This upper base 41 terminates in downwardly projecting side legs 42, the latter being separate from the remaining side structure of the support due to the provision of slits or cuts 43 formed in the support so that the side legs 42 can be independently deformed. These side legs 42 are, intermediate the length thereof, deformed inwardly so as to define upper parts 44 which project downwardly into the annular recess which surrounds the neck part 18, whereby these upper parts 44 are disposed axially between the enlarged head 10 and the enlarged threaded part 17 to create an axial securement between the support and the screw member. These upper parts 44 are spaced apart by a distance which is less than the diameter of the threaded part 17, and in fact are normally spaced apart by a distance which only slightly exceeds the diameter of the neck part 18. The upper parts 44 project downwardly approximately to or preferably slightly below the diametral plane 23, following which the upper parts 44 are bent outwardly so as to define arcuate lower parts 45 which again merge smoothly with the lower leg parts 26 when viewed longitudinally of the support. These lower parts in turn terminate in opposed inwardly projecting lugs 46, the free edges of which are positioned in close proximity to one another. The lugs 46 again project into the annular clearance space which surrounds the neck part 18 so as to be axially confined between the head 19 and the threaded part 17.

The upper parts 44 and lugs 46 cooperate to provide for close confinement of the neck part 18 of the screw member, thereby providing not only great rigidity but also serving to axially lock the screw member relative to the support. This structure of the side legs 42, and their cooperation with the screw member, also is desirable for supporting the reactive forces when applying a work tightening torque to the head of the screw member so as to avoid damage to the teeth of the band.

As illustrated by FIG. 1, the legs 42 have a width which substantially equals the width of the annular recess surrounding the neck part 18 so as to effectively eliminate axial looseness. Further, the lugs 46, in their transverse or sideward direction, are preferably slanted so as to facilitate removal of the band end 12.

The lugs 46 provide the following three working functions, as explained below.

The first is that of supporting the head of the endless screw, and improving to a large extent the efficiency of the clamping collar; when applying a tightening torque by means of a hexagonal wrench the head of the screw does not slant downwards in a plane which coincides with its longitudinal axis, for in fact it does not generate the friction typical of conventional systems between the head of the screw and the grooved teeth or serrations of the band causing loss of efficiency of the whole.

The second is that of increasing the bearing surface of the head of the screw and preventing the latter from penetrating into the support.

The third is that of avoiding the tendency which the band has of rotating in a clockwise direction as a consequence of the forces generated by the screw on the band.

The interfitting mounting structure 27 also possesses advantages, as explained below.

The purpose of tabs 38 is that of supporting the longitudinal stresses produced by the band on the support, as caused by the action of the endless screw on tightening the collar.

The locking tabs 34 serve, together with the retaining tabs 38, for preventing support 13 from moving forwards as a consequence of the stress created on same by the screw when tightening the band. Another advantage of tabs 34 is that of providing closure for the ends of recess 39 which remain between the support and the band.

On the outer edge of lug 36, a traction force is exerted following the rotary torque transmitted by the screw to support 13. Said force tends to cause the lug to rotate on the outer edge of the band producing a twist on said band. It is evident that as the distance between the edge of the band and the retaining tabs increases, the resistant torque will be greater at the same time as the section of the band subjected to twisting will be greater, resulting in a better rigidity of the system.

At the same time, because of said offset of notch 33, the retaining tab 38 of lug 37 remains situated in the same zone in the center of the screw, which prevents the retaining tab 38 from coming out of engagement with the band resulting from the torque applied; the screw has a downward action on the side of its head promoting better retention of tab 38 between the band and the rubber sleeve.

The support 13, in the illustrated embodiment, is preferably formed by being stamped from a metal plate, which plate can then be suitably deformed to provide the desired shape of the support.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a clamping collar of the type comprising a hooped band having one end and an opposite end, a rotatable screw having a threaded portion and a head and a neck interposed between said head and threaded portion, a support for said rotatable screw, said support being fixed on said one end of said band, said rotatable screw meshing with teeth formed in said opposite end of said band, said support including a portion having a U-shaped cross section straddling said screw, said support having a pair of first lugs extending from opposite sides of said U-shaped portion toward each other and cooperating with said U-shaped portion to substantially surround the threaded portion of said screw and said one end of the band, said first lugs engaging said one end of said band and fixing said band to said support, said U-shaped portion having opposed areas which are fitted close to the neck of the screw, the improvement wherein said support includes a pair of second lugs extending from opposite sides of said U-shaped portion toward each other and fitted close to the neck of the screw, opposite sides of said neck respectively facing said U-shaped portion and said second lugs, said second lugs blocking axial movement of the screw head therepast, said second lugs being axially separated from said first lugs, wherein said second lugs are bent toward said neck along a curve away from the teeth of the band so as to prevent the teeth of the band from being damaged by contact with said second lugs upon application of a tightening torque to the screw.

2. In a clamping collar of the type comprising a hooped band having one end and an opposite end, a rotatable screw having a threaded portion and a head and a neck interposed between said head and threaded portion, a support for said rotatable screw, said support being fixed on said one end of said band, said rotatable screw meshing with teeth formed in said opposite end of said band, said support including a portion having a U-shaped cross section straddling said screw, said support having a pair of first lugs extending from opposite sides of said U-shaped portion toward each other and cooperating with said U-shaped portion to substantially surround the threaded portion of said screw and said one end of the band, said first lugs engaging said one end of said band and fixing said band to said support, said U-shaped portion having opposed areas which are fitted close to the neck of the screw, the improvement wherein said support includes a pair of second lugs extending from opposite sides of said U-shaped portion toward each other and fitted close to the neck of the screw, opposite sides of said neck respectively facing said U-shaped portion and said second lugs, said second lugs blocking axial movement of the screw head therepast, said second lugs being axially separated from said first lugs, wherein said second lugs are slanted radially inward in a direction axially from said screw head toward said threaded portion to facilitate movement of the toothed end of the band through the support during tightening and loosening of the clamping collar.

3. A clamping collar according to claim 1, wherein the band has notch means at its said one end, said first lugs and screw sandwiching the band therebetween, said first lugs together having four upset retaining tabs which project into said notch means in the band, said band having locking tabs which project into hollows left by the upsetting of said upset tabs of said first lugs such that said first lugs have opposite faces respectively engaging said locking tabs and the adjacent surface of said other end of said band.

4. A clamping collar according to claim 1, in which said first lugs have two free corners each, each corner having a recess, the recesses of one said first lug opposing respectively the recesses of the other said first lug, said band having a pair of locking tabs projecting toward each other along a line substantially centered widthwise of the band, said locking tabs each being received in two opposed ones of said recesses to lie at substantially flush with portions of the first lugs adjacent said recesses.

5. A clamping collar according to claim 1, wherein the hooped band forms a closed curve and the first lugs lie radially inside the closed curve and the second lugs are spaced radially outside said closed curve.

* * * * *